United States Patent Office 3,267,381
Patented August 16, 1966

3,267,381
ANTENNA SPEED AND REFERENCE BURST
COUNT MONITOR
Dean S. Thornberg and Richard M. Jepperson, Salt Lake
City, Utah, assignors to Montek Division of Model Engineering and Manufacturing Corporation, Salt Lake
City, Utah, a corporation of Indiana
Filed Oct. 7, 1963, Ser. No. 314,398
7 Claims. (Cl. 328—41)

The present invention relates to a reference pulse count monitor component for use in monitoring the operation of electronic beacons and other equipment operations, and for use as test sets such as used in tactical air control and navigation equipment, and has more particular reference to an improved circuit for monitoring and counting the number of acceptable reference bursts over a period of a second or other time unit to determine that tactical air control and navigation equipment such as an antenna system to which it is applied for monitoring may be acknowledged as properly functioning, and indicating that an antenna for a beacon system may be properly rotating at a selected number of revolutions per minute with a degree of proficiency.

The circuit of the invention includes an acceptance network comprising a NOR gate which receives a reference burst acceptance pulse and auxiliary burst acceptance pulses, a stage of serially connected flip-flop counters driven by said acceptance pulses derived from the output of the NOR gate, a NAND gate responsive to selected states or conditions of the flip-flop counters and also responsive to a clock pulse, and a time delay network having a time constant slightly longer in time than the time interval between clock pulses and connected to the output of the NAND gate so that an alarm pulse is produced from time delay network in the absence of an output pulse from the NAND gate, which would inhibit the time delay network.

It is an object of the invention to provide serially connected stages of flip-flop counters and a gate which is responsive to accurately counting the significant bursts or pulses that are reference or auxiliary in character, to provide an accurate monitor of the beacon antenna as it rotates.

A further object of the invention is to determine that sets of pulses are properly being accepted within a determined time interval to inhibit an alarm system actuated by the monitoring components of the present invention.

One embodiment of the invention provides that 120 auxiliary bursts may be provided in one second, and 15 NORTH or reference bursts are correspondingly provided per second. The total number of reference bursts in this embodiment is therefore 135 per second. Since there are 15 reference bursts in one second, the antenna of the system would necessarily rotate at 15 revolutions per second, and if any one reference burst is lost, the total count of reference and auxiliary bursts will decrease by 15 per second.

Figure 1:
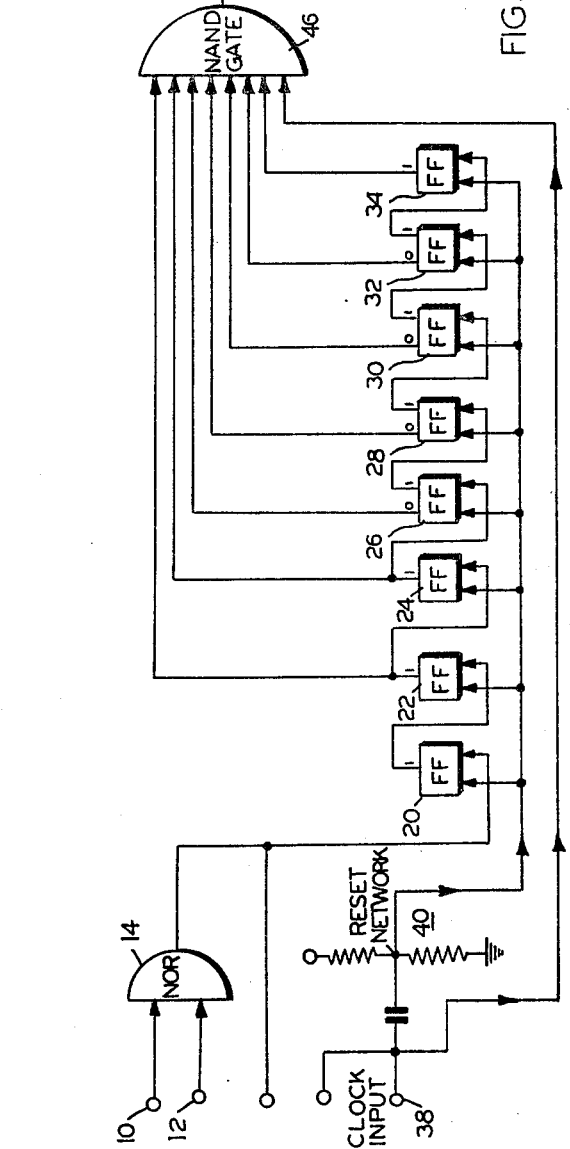
Figure 2:
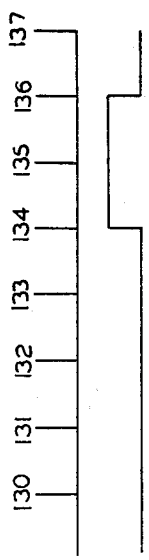

The invention will now be described in detail in connection with the accompanying drawing in which:

FIGURE 1 is a combined schematic and block diagram of an antenna speed and reference burst count monitor in accordance with a preferred embodiment of the present invention; and FIGURE 2 is a time chart of the pulse output of the NOR gate and the one second pulse at the interval of time proximate to the one second pulse.

Referring now to the drawing, a NORTH or reference burst pulse oscillator (not shown) generates an accept pulse for each auxiliary and NORTH burst and is characterized as a positive-going pulse being 10 microseconds wide and 30 volts in amplitude. These are accepted respectively at terminals 10, 12 which are the input to NOR gate 14. Both pulses applied to terminals 10, 12 are inverted at the output of the NOR gate, and drive serially connected stages of flip-flop counters 20–34. The drawing shows that an exemplary embodiment of the invention provides eight such flip-flop counters. Each counter is reset every second by a clock input applied to terminal 38, which clock input pulse passes through a reset network 40, which provides a reset pulse every second. The clock input pulse may be therefore from a one cycle per second oscillator (not shown). The serially connected stages of flip-flop counters after the first counter, that is excluding flip-flop counter 20, are taken from the respective conditions of the several flip-flop counters 22–34 so that, together with the clock input pulse applied to terminal 38, the outputs are thus applied to condition an 8-input NAND gate 46. As is shown, the inputs to the NAND gate are in coincidence at the NAND gate only when the counter contains a count greater than 134 but less than 136, that is to say that the NAND gate is conditioned upon the receipt of the 134th pulse and this conditioned state will terminate with the 136th pulse. This is shown graphically in FIGURE 2.

This count is obtained when the flip-flop counter contains:

| Flip-flop counts | 1 | 2 | 4 | 8 | 16 | 32 | 64 | 128 |
|---|---|---|---|---|---|---|---|---|
| Contents | x | 1 | 1 | 0 | 0 | 0 | 0 | 1 |

The sum of 128+4+2=134.

The 135th pulse does not effect the counter contents of the counter stages that are being used, but the 136th pulse will change the contents of the serially connected stages of counters to a stage in which the NAND gate is no longer conditioned. A more complete understanding of the states of the respective flip-flop counters with respect to the pulse in the neighborhood of the time being monitored is illustrated as follows:

| Flip-flop counter of Fig. 1 | 20 | 22 | 24 | 26 | 28 | 30 | 32 | 34 | Contents after the Nth pulse |
|---|---|---|---|---|---|---|---|---|---|
| | 1 | 0 | 1 | 0 | 0 | 0 | 0 | 1 | 133 |
| | 0 | 1 | 1 | 0 | 0 | 0 | 0 | 1 | 134 |
| | 1 | 1 | 1 | 0 | 0 | 0 | 0 | 1 | 135 |
| | 0 | 0 | 0 | 1 | 0 | 0 | 0 | 1 | 136 |
| | 1 | 0 | 0 | 1 | 0 | 0 | 0 | 1 | 137 |

It follows from the above illustration that the NAND gate 46 deriving its inputs from flip-flop counters 22–34 is conditioned only when the counters 22, 24, 34 are in ONE state and the flip-flop counters 26, 28, 30, 32 are in the ZERO state. The flip-flop counter 20 need not be connected to the NAND gate and its state is not relative to the conditioning of the NAND gate. The NAND gate is also energized by the clock input pulse from terminal 38, and this pulse which occurs in pulses at one second intervals arrives at the input to the NAND gate 46 at some time immediately after the 134th pulse and prior to the 136th pulse. The time interval between any two pulses of the pulses applied to the flip-flop counter 20 is 1/135th of the total time, or 0.0074 which is 0.74% of the total interval of time. The NAND gate is therefore open for a short interval on either side of the reference 135th pulse for a total acceptance range of plus or minus 0.74% of the total time period. When the clock pulse is received at terminal 38, the reset network 40 provides a delay pulse which is applied to each of the flip-flop counters 20–34 to reset the flip-flops to zero. This conditions the serially connected stages of flip-flop counters to be ready for recounting the pulses during the next interval of time during which pulses are provided by the NOR gate 14 to the serially connected stages of flip-flop counters 20–34. Thus the next pulse received after the resetting of the flip-flop counters by the pulse from the reset network 40 will be the first pulse in the next period. It is well known that in the usual digital counter the counter accuracy is given as plus or minus one count. Since there is no reset or display time lost in the present embodiment of the digital counter, this is not true in the present system. Describing the advantage of the present system and the improved counter accuracy achieved in the present digital type counter, consider the operation of a normal display counter. In such display type counter, a one second pulse resets the flip-flop counters and then opens a gate. The pulses to be counted are then permitted to pass the gate and be counted. When a one second pulse is again received, the gate is closed and the contents of the counter are permitted to remain for a period determined by a display time multivibrator. When the display time runs out, the next one second pulse conditions the gate to permit the pulses to be again counted. Since the one second pulses, the display time multivibrator, and the pulses to be counted are not synchronous, the total count may jitter or vary by plus or minus one count.

In the configuration of the present invention, there is not such an inconsistency, since there is no display time required and there is not count gate required to be used. Immediately after the serially connected stages of flip-flop counters are reset by the reset network 40, the first flip-flop counter 20 is ready to accept the next pulse to be counted.

As is illustrated in FIG. 2, the reference or clock pulse occurring every one second as applied through the reset network 40 resets the serially connected stages of flip-flop counters upon or substantially at the same time as the 136th pulse is received. The serially connected stages of counters start over again on the next pulse to count the number of pulses until the next one second pulse arrives and is applied to the stages of counters. If the two frequencies, i.e., the pulses applied from the NOR gate 14 and the clock input pulses at terminal 38, were perfectly stable the action of counting and resetting the counters would continue on indefinitely. In the case of an actual antenna drive output, however, the antenna speed does wander slightly due to the hunting of the servo system which drives the antenna. Thus in actual practice, it is desired to maintain the average speed within required tolerances for a period of time for which the alarm delay or time delay circuit 60 is set. In one embodiment of the invention, the alarm delay period is set at about six seconds. The time delay circuit 60 includes an inverter 62, an inverter 64, and an unijunction transistor circuit 66 to convey any alarm signal to an alarm relay (not shown) that is connected to an output terminal 68 of the time delay circuit 60. A time delay adjustment network 72 is provided for further adjusting the time delay from a value such as 0.5 to 6 seconds, so that in the absence of an alarm inhibit pulse from the NAND gate 46 an alarm pulse is produced at terminal 68 to energize the alarm relay. If desired, an additional alarm inhibit pulse may be provided over conductor 74 to reset the time delay circuit 60 from producing or generating the alarm pulse to the alarm relay connected to terminal 68. Terminal 76 is connected to the output of the NAND gate 46 to provide a test point for the alarm inhibit pulse which is coupled from the NAND gate to the inverter circuit 62, as shown. The time delay adjustment circuit 72 includes the capacitor 82, and the time delay function operates to produce the time delay function in a manner well known in the art. Thus the output of the NAND gate prevents the alarm delay circuit 60 from operating and producing alarm pulses at terminal 68. If no accept pulses are received at terminals 10 and 12 over the predetermined interval of time as determined by the time delay adjustment circuit 72, the alarm delay circuit connected to terminal 68 will fire and indicate a failure of the pulse inputs applied to terminals 10, 12 and 38.

There is thus provided means to indicate a failure of a parameter in a monitoring and test set circuit useful in pulse systems such as tactical air control and navigation beacon systems to monitor the rate of antenna rotation within substantially accurate limits. One system using the present invention provides for the determination of the rate of rotation of an antenna at 900 r.p.m. within an accuracy of plus or minus 4.5 r.p.m.'s, and this is accomplished merely by counting the number of acceptable reference bursts or pulses within a period of one second as determined by clock pulses, and the loss of any one pulse per antenna revolution therefore results in an alarm pulse at terminal 68 of the count monitor shown in FIG. 1.

It is understood that the specific apparatus herein schemtaically illustrated and described in intended to be representative only, as there are many changes which may be made therein without departing from the clear teachings of the invention. Accordingly, reference should be made to the following claims in determining the full scope of the invention.

What is claimed is:
1. A reference count monitor system comprising:
means for receiving a number of count pulses;
means for receiving clock pulses;
serially connected stages of flip-flop counters driven by said count pulses receiving means in which the number of count pulses is sufficient to drive the final flip-flop counter of said stages;
a NAND gate responsive to a selected output of each of the stages of the flip-flop counters after the first stage and also responsive to the clock pulses of the clock pulses receiving means;
a time delay network responsive to the NAND gate, said time delay network being inhibited by the output pulse of the NAND gate and being actuated to produce an alarm pulse in the absence of an output pulse of the NAND gate after the time delay of the network.

2. A reference count monitor system comprising:
serially connected stages of flip-flop counters driven by count pulses in which the number of count pulses is sufficient to drive the final flip-flop counter of said stages;
a NAND gate responsive to a selected state of each of the stages of the flip-flop counters after the first stage, said NAND gate being also responsive to clock pulses;
a time delay network responsive to the NAND gate, said time delay network being inhibited by the output pulse of the NAND gate and said network being actuated to produce an alarm pulse in the absence of an output pulse of the NAND gate after the delay time of the time delay network.

3. A reference count monitor system comprising:
means for receiving a predetermined number of count pulses;
means for receiving clock pulses having a longer interval between the clock pulses than between the count pulses;

serially connected stages of counters driven by said count receiving means in which the number of count pulses is sufficient to drive the final counter of said stage at least when said predetermined number of count pulses is received;

a NAND gate responsive to a selected output of each of the stages of the counters after the first stage and also responsive to the clock pulses of the clock pulses receiving means for producing an alarm inhibit pulse; and a time delay network responsive to the NAND gate, said time delay network being inhibited by the alarm inhibit pulse of the NAND gate and being actuated to produce an alarm pulse in the absence of said alarm inhibit pulse of the NAND gate.

4. A reference count monitor for producing an alarm signal comprising:

gate means for receiving a number of reference and auxiliary count pulses;

means for receiving clock pulses;

serially connected stages of flip-flop counters driven by said count pulses receiving means in which the number of count pulses is sufficient to drive the final flip-flop counter of said stage;

a NAND gate producing an alarm inhibit pulse in response to a selected output of each of the stages of the flip-flop counters after the first stage and also in response coincidently therewith to the clock pulses of the clock pulses receiving means;

a time delay network responsive to the NAND gate, said time delay network being inhibited by the alarm inhibit pulse of the NAND gate and being actuated to produce an alarm pulse in the absence of an output pulse of the NAND gate; and reset means responsive to the clock pulses receiving means to produce a reset pulse for setting the flip-flop counters to an original state.

5. The reference count monitor of claim 4 wherein the time delay network comprises time delay adjustment components, an inverter, inverter means for receiving an alarm inhibit pulse external of the monitor and from the NAND gate, and an unijunction transistor stage for coupling the alarm pulse to an output terminal.

6. The reference count monitor of claim 5 wherein said serially connected stages of flip-flop counters count at the rate of 135 pulses per second.

7. A reference count monitor system comprising:

means for receiving a number of count pulses;

means for receiving clock pulses;

a digital counter having interval stages and driven by said count pulses receiving means in which a predetermined number of count pulses is sufficient to drive the digital counter to produce an output;

a NAND gate responsive to a selected condition of a portion of the stages of the digital counters after a first stage, said NAND gate also responsive to the clock pulses of the clock pulses receiving means; and a time delay network responsive to an alarm inhibit pulse output of the NAND gate, said time delay network being inhibited by said pulse output of the NAND gate and being actuable to produce an alarm pulse in the absence of said pulse output of the NAND gate.

No references cited.

ARTHUR GAUSS, *Primary Examiner.*